Oct. 28, 1952     J. H. PALMER     2,615,386
AUTOMATIC ELECTRIC TOASTER
Filed Sept. 2, 1949     2 SHEETS—SHEET 2
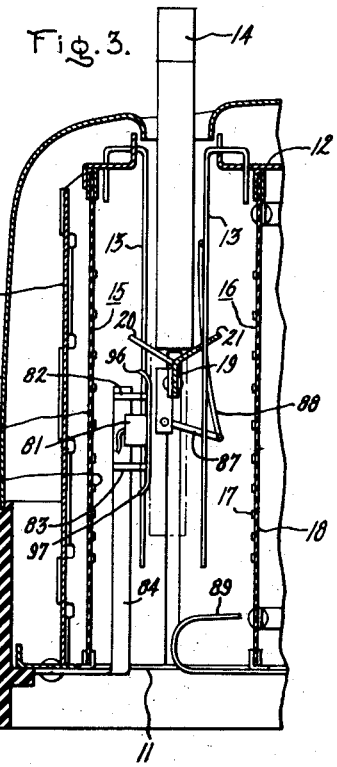
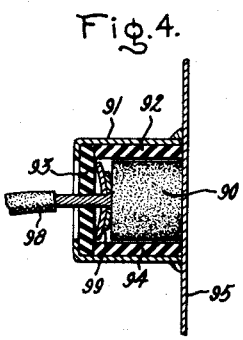
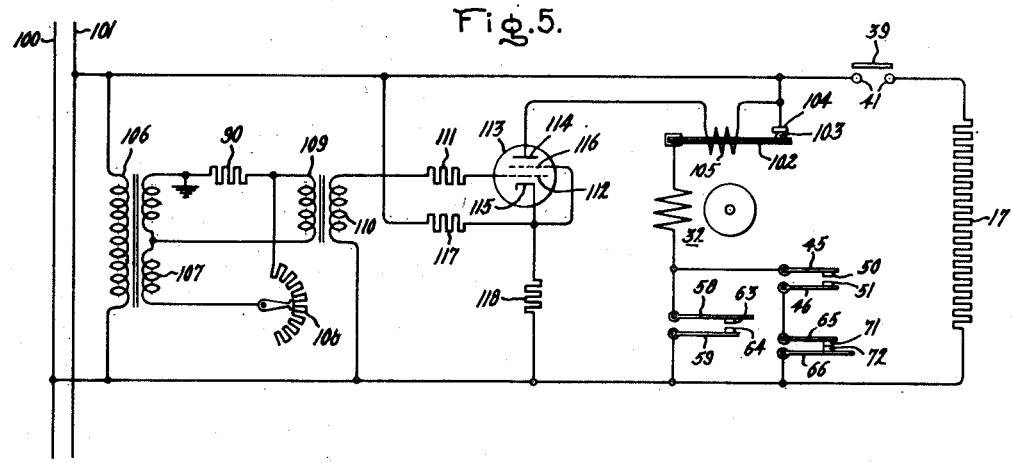
Inventor:
John H. Palmer,
by *Sheridan W. Biggs*
His Attorney.

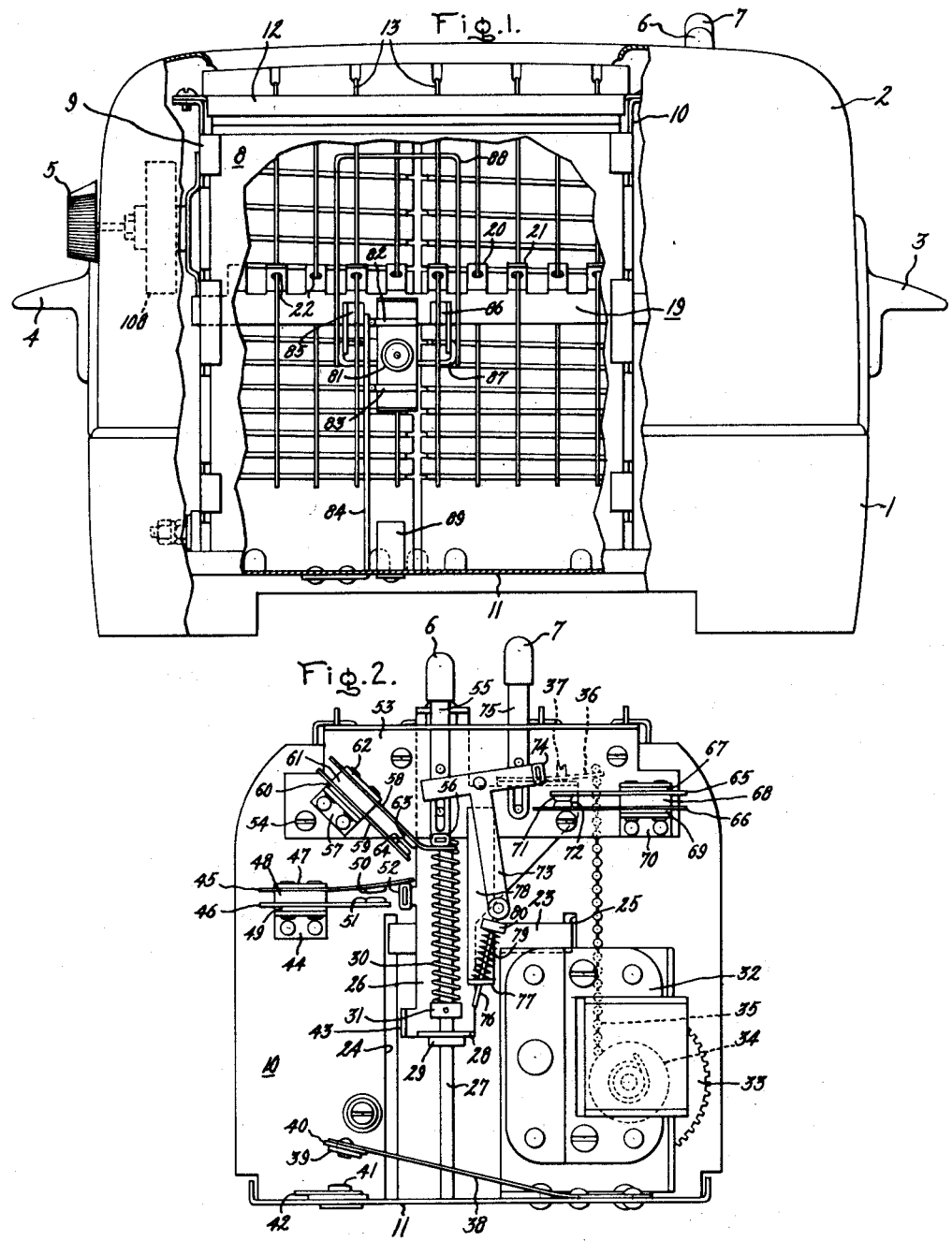

Patented Oct. 28, 1952

2,615,386

UNITED STATES PATENT OFFICE 2,615,386

AUTOMATIC ELECTRIC TOASTER

John H. Palmer, Milford, Conn., assignor to General Electric Company, a corporation of New York Application September 2, 1949, Serial No. 113,826

5 Claims. (Cl. 99—329)

1

This invention relates to electric cooking devices and more particularly to automatic toast making apparatus.

An object of my invention is to provide an automatic electric toaster with an improved timing arrangement to adjustably control the length of the toasting cycle.

Another object of my invention is to provide a device for an electric toaster which automatically terminates the toasting operation in response to the surface temperature of the toast.

Still a further object of my invention is to construct a thermal control for the toasting compartment of an electric toaster which functions automatically to terminate the toasting cycle without the use of moving contacts in the toasting compartment. This construction provides greater reliability inasmuch as the control element is thermally associated with the toast without employing movable contact elements subject to fouling by crumbs or other matter.

In accomplishement of the foregoing objectives, a feature of my invention consists in an improved control for a toaster of the type having an automatic electromagnetic drive for lowering the toast to a toasting position, energizing the main toaster heating element, terminating the toaster operation and raising the completed product to an exposed position for ready removal. This control employs a non-metallic substance having a high temperature coefficient of resistance, with a bread-positioner to force a slice being toasted into intimate thermal contact with the thermally responsive substance. The change in resistance, in response to the surface temperature of the toast, alters an electric circuit, into which the thermally responsive substance is placed, to operate a relay for terminating the toasting operation.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevation with surfaces partially broken away to illustrate the toaster interior; Fig. 2 is an end elevation illustrating the toaster operating mechanism; Fig. 3 is a partial end elevation in section; Fig. 4 is an enlarged cross-sectional view of a component; and Fig. 5 is a schematic wiring diagram.

Referring to Fig. 1 of the drawing, I have shown a toaster embodying my invention having a suitable outer casing comprising a plastic base portion 1 and an upper metallic hood 2. For convenience, suitable handles 3 and 4 may be attached to hood 2. A color control knob 5 is provided external of the toaster hood to permit the operator to adjust the toaster for producing toast of the desired color by regulation of the toasting cycle time. A push button 6, as shown by Fig. 2, is provided at the top of the toaster for commencing operation. Mounted adjacent start button 6 is a stop button 7 which may be depressed to terminate toaster operation at any time during a toasting cycle.

The upper hood 2 and base 1 enclose both a toasting compartment and a mechanism compartment. The toasting compartment is completely enclosed, except for toast receiving slots, by side plates, such as 8 shown in Fig. 1, end plates 9 and 10, and a base plate 11. A top plate 12 is arranged with suitable slot defining means for reception of slices of bread or other material to be toasted. The upper surface of hood 2 is also slotted in alignment with the slots in top plate 12, as best shown by Fig. 3. It is to be understood that either one or a plurality of toast receiving slots may be provided through hood 2 and top plate 12 in accordance with this invention. Top plate 12 supports a plurality of guide wires 13 as illustrated by Figs. 1 and 3. Guide wires 13 retain a slice of material to be toasted, such as bread slice 14 shown by Fig. 3, centrally spaced between main toaster heating elements, shown at 15 and 16 in Fig. 3. These toaster heating elements are supported between top plate 12 and base plate 11. Each heating element comprises a length of resistance wire 17 mounted on an insulating backing 18, such as a sheet of mica, or other similar material which is not disintegrated by the heat within the toasting chamber. A pair of such heating elements are provided for each toast receiving slot as shown by Fig. 3. A toast carrying rack 19 is provided for each toast receiving slot. This rack is made up from a flat strip of metal with a plurality of alternate oppositely extending ears 20 and 21. Each of these ears is apertured as at 22 for sliding movement on guide wires 13.

The toast carrying racks for each toast receiving slot are connected together and mounted for vertical reciprocating movement between the non-toasting position, shown in Fig. 1, and a lower or toasting position. In the present instance, this toaster is illustrated as having a pair of toast carrying racks so that two slices of bread may be toasted simultaneously. Referring to Fig. 2, the toast carrying racks are connected together by a cross piece 23. In carrying out my invention, the toast carrying racks and cross piece 23 are made integrally. End plate 10 is slotted as at 24 and 25 to permit the reciprocating vertical movement of the toast carrying racks and the cross piece. A carriage supporting plate 26, secured to cross piece 23, is slidably mounted on a rod 27. For this purpose, supporting plate 26 may include outwardly extending ears such as 28 at its upper and lower ends, with a bushing 29 secured to each ear. The assembly of the bread supporting racks, the cross piece connecting these racks together and the carriage supporting plate is hereinafter referred to as the toast carriage. The toast carriage is resiliently biased upwardly to its non-toasting position by a spring or other suitable resilient means 30 mounted on rod 27. The lower end of this spring is positioned by a collar 31 secured to rod 27, so that whenever the toast carriage is lowered to its toasting position, spring 30 is compressed.

In accordance with this construction, a power drive is provided for lowering the toast carriage to its toasting position and compressing spring 30. During the toaster operation, this power drive retains the carriage in its lowered position until completion of the toasting cycle. When the power drive is de-energized, spring 30 returns the carriage to its upper non-toasting position. In the present embodiment the power drive comprises an electromagnetic motor 32. It is to be understood, however, that other electrically operated power drives may be employed in accordance with this invention for lowering the toast carriage and compressing the carriage spring. Motor 32, as here shown in Fig. 2, includes a suitable gear reduction leading to a final drive gear 33. Connected to this final drive gear is a winding drum 34, to which is secured a flexible chain 35 extending from the drum to an adjustable resilient arm 36 on carriage supporting plate 26. An adjusting screw 37 permits factory adjustment of the position of resilient arm 36 with respect to the carriage supporting plate. Therefore, to lower the toast carriage, power is supplied to motor 32, which drives through its reduction gearing the drum 34. Rotation of drum 34 winds chain 35 around its outer surface and lowers the carriage to toasting position. Resilient arm 36 prevents a sudden shock to the motor and the toast carriage when the carriage reaches its lowermost position.

The downward movement of the toast carriage in accordance with this construction is adapted to complete the electrical circuit to the resistance wires 17 of the toaster heating element. This is accomplished by riveting or otherwise attaching a resilient arm 38 to base plate 11, the outer end of this resilient arm carrying a bridging contact member 39 on an insulator 40. Downward movement of the bridging contact member 39 completes the circuit through a pair of fixed contact members 41 secured on suitable insulating blocks 42 to base plate 11. Carriage supporting plate 26 has an outwardly extending arm 43 on its lower end which strikes resilient arm 38 upon downward movement of the carriage. Therefore, whenever the toast carriage is driven downward to its toasting position, power will be supplied to the toaster heating element by the automatic closure of bridging contact 39 with terminals 41 of the heating element.

It may be noted at this point that motor 32 is of the type known as a torque motor. As explained above, when power is supplied to this motor it functions to lower the toast carriage. When the toast carriage has reached its lowermost position however, the motor is no longer able to rotate the reduction gearing, and hence it is stalled. The windings of this motor are so arranged that it may remain in this stalled position for a period of time without damage. Therefore, the toaster may be operated merely by applying power to motor 32 to lower the toast carriage, and keeping the motor energized throughout the toasting cycle. As soon as the motor power supply is interrupted, the resilient member 30 returns the carriage to its non-toasting position.

To initiate toaster operation by energizing motor 32, I prefer to employ a carriage-operated switch. Referring to Fig. 2, this switch, mounted on end plate 10 by an angle bracket 44, includes a pair of contact arms 45 and 46 held between insulating blocks 47, 48, and 49. Contact points 50 and 51 respectively are carried by these contact arms. The upper contact arm 45 is oriented for co-operation with an insulating bushing 52 carried on an outwardly extending ear provided on carriage supporting plate 26, so that when the carriage is in its upper non-toasting position, insulating bushing 52 opens contacts 50 and 51. Upper contact arm 45 resiliently biases contact 50 toward contact 51, whereby a slight downward movement of the carriage results in a closing of contact points 50 and 51, applying power to motor 32, and thus commencing a toasting cycle. With this arrangement the toaster operator merely need place a slice of bread in one of the toast receiving slots with a slight downward pressure on the slice itself to commence toaster operation which continues until the motor circuit is broken by an arrangement to be described at a later point.

While I prefer to employ a carriage-operated switch for commencing the toasting operation, the same function may be accomplished by a manually-operated switch. Referring again to Fig. 2, a switch plate 53 is attached to end plate 10 by a plurality of threaded fastening devices 54. A flat operating rod 55, having at its upper end the start button 6, is slidably supported on switch plate 53. The lower end of rod 55 includes an insulating bushing 56. Switch plate 53 also carries on an angle bracket 57 a pair of resilient contact arms 58 and 59 supported between insulating blocks 60, 61, and 62. Contact points 63 and 64, carried by arms 58 and 59, are in a normally open position. However, the contact arm 58 has an outwardly extending portion, which is in the path of travel of insulating bushing 56 resulting from a downward movement of start button 6, to force contact 63 against contact 64 and initiate motor operation. Obviously, this switch including contacts 63 and 64 could be eliminated, the same result being accomplished by arranging operating rod 55 so that it would impart an initial slight downward movement of the toast carriage to close contacts 50 and 51 and start motor operation.

Since it is occasionally desirable to interrupt toaster operations before the completion of an automatically timed cycle, I provide manually operable means for breaking the motor circuit. This means is shown in Fig. 2 as a pair of contact arms 65 and 66 supported between insulating blocks 67, 68, and 69 on an angle bracket 70 riveted or otherwise secured to switch plate 53. These contact arms carry normally closed contact points 71 and 72. A T-shaped rocker lever 73 is pivotally supported on switch plate 53, with the right-hand end of the head of the T carrying an insulating bushing 74. The path of travel of this insulating bushing upon rotation of the lever 73 is such that the bushing comes into contact with the outer end of the lower contact arm 66 to force contacts 71 and 72 apart. This rotary motion of lever 73 is imparted by a rod 75 slidably mounted on switch plate 53. The upper end of rod 75 carries the stop button 7. Therefore, a depression of stop button 7 at any time during a toasting cycle immediately interrupts motor operation by opening contact points 71 and 72.

T-headed rocker lever 73 also functions as a toggle mechanism, so that when either the start or stop button is depressed, the other button will be raised to its upper or inoperative position. Pivotally supported on the lower end of lever 73 is a toggle rod 76 extending downwardly through an apertured ear 77 on a depending member 78 carried by the switch plate. A spring 79 is held under compression on toggle rod 76 between a collar 80 on the toggle rod and the ear 77. With this arrangement, the compressive stress in spring 79 holds the rocker lever 73 in one or the other of its extreme positions.

The construction thus far described is substantially similar to the toaster disclosed by my copending application, Serial No. 113,306, filed August 31, 1949 now Patent No. 2,566,904, dated Sept. 4, 1951, assigned to the assignee of the present invention, and it is described herein in order that my present invention may be better understood.

This invention is particularly directed to an improved control for automatically regulating the duration of a toasting cycle. Referring to Fig. 3, this automatic control function results from the use of a temperature responsive element 81, attached by wires 82 and 83 to a bracket 84, which is in turn secured to base plate 11. Preferably the wires 82 and 83 are of material of low heat conductivity to reduce undesired heat transfer to the thermally responsive element 81. As illustrated by Fig. 3, this heat responsive element is mounted adjacent a toast-receiving slot, so that it is sensitive principally to the surface temperature of the toast. A bread positioner is provided to force a surface of the toast into thermal contact with the heat responsive element. This construction, as shown most clearly by Fig. 1, includes brackets 85 and 86 attached by any suitable means to bread-supporting rack 19. The lower end of each of these brackets is apertured to receive an end of a C-shaped actuating member 87. Attached to actuating member 87 is an arm in the form of a bail wire 88 of substantially U-shape, with its upper horizontal portion inside of guide wires 13, as shown in Fig. 3. A downward movement of the toast carriage results in actuating member 87 coming into contact with a stop 89 affixed to base plate 11. This causes the actuating member to rotate in a counterclockwise direction, forcing the upper end of bail wire 88 against the slice 14. Thus, whenever the toast supporting rack is in its lower or toasting position, the bread positioner assembly forces the slice 14 into intimate thermal contact with temperature responsive element 81.

For the temperature responsive element, I prefer to use a non-metallic thermally sensitive resistor. Such resistances, commonly known as thermistors, consist principally of a finely divided metallic oxide, or a mixture of a plurality of metallic oxides, sintered to form a resistance element of the desired size and shape. Typical of such substances are the oxides of manganese, nickel, cobalt, copper, chromium, etc. This non-metallic thermally sensitive resistor will be hereinafter referred to as a thermistor. Referring to Fig. 4, a thermistor 90 is mounted within an outer protective metallic cup 91 and insulated therefrom by blocks of thermally insulating material 92, 93, and 94. Attached to the open end of cup 91, by welding or other suitable means, is a shoe 95 with curved ends 96 and 97, shown in Fig. 3, to permit a sliding movement of the toast slice with respect to the thermistor. Preferably the shoe is constructed of a thin, highly heat conductive metal. Therefore, upon lowering of the toast carriage and actuation of the bread positioner, the thermistor is sensitive principally to the surface temperature of the toast. A terminal lead 98, having soldered or otherwise attached thereto spring washers 99, extends inside of protective cup 90 to form one of the terminals for the thermistor. The other thermistor terminal results from grounding of the entire heat-sensitive element 81 to the toaster frame.

Referring to Fig. 5, I have shown schematically a wiring diagram for this toaster. Electrical power for toaster operation is supplied through lines 100 and 101. As described above, toaster operation is dependent entirely upon supply of power to motor 32. In addition to the other starting and stopping switches described, automatic control is provided by the use of a bimetallic strip 102 carrying on its free or movable end a contact point 103 co-operable with a fixed contact 104. Contact points 103 and 104 are normally closed when the bimetallic element 102 is cool. Therefore, toaster operation may be initiated by closing contacts 50 and 51 of the carriage-operated switch or contacts 63 and 64 of the manually-operated switch, it being understood that the manually-operating switch may be eliminated, if desired. Upon energization of motor 32, the downward movement of the carriage forces bridging contact 39 into engagement with fixed contacts 41 for supplying power to the main toaster heating element 17. Automatic termination of the toasting cycle is accomplished by the heat responsive motion of bimetallic strip 102 separating contact point 103 from contact point 104, as a result of heat supplied by a small heating element 105 provided in thermal relation with the bimetallic element. It may be noted at this point that in lieu of employing a bimetallic strip and a heater for opening contacts 103 and 104, a small relay might equally well be employed.

In accordance with my invention, separation of contact 103 from contact 104 for automatically interrupting toaster operation is effected in response to the resistance change of the thermally responsive element 81 upon increase of the surface temperature of the toast. The effect of the decrease in resistance of thermistor 90 is amplified to supply power to heater 105. Referring again to Fig. 5, a transformer primary 106 is connected across the incoming electrical supply lines. Connected across a secondary 107 of this transformer are thermistor 90 and a variable resistance 108. The variable resistance 108 is shown in dotted lines in Fig. 1, and it is adjustable by the color control knob 5 so that the operator may adjust the extent of toasting. In series with thermistor 90, one side of which is grounded to the toaster frame, is the primary 109 of a second transformer. The other terminal of primary 109 may be connected to a center tap on secondary 107 of the first transformer. A secondary 110 of this second transformer is connected through an appropriate resistor 111 to a control grid 112 of a gaseous discharge device 113. Device 113, preferably a thyratron, includes the usual plate 114, cathode 115, and a screen grid 116. The screen grid is connected to a point between two resistors 117 and 118 of selected resistance values to obtain the desired tube operating characteristic. The plate circuit of the thyratron supplies power to bimetallic strip heating element 105. Hence, whenever the thyratron is conducting, heat is supplied to bimetallic strip 102 to open contacts 103 and 104. With this bridge arrangement of thermistor 90 and variable resistor 108, the magnitude and phase of voltage applied across transformer primary 109 is dependent on the relative resistance of the thermistor with respect to the variable resistor. For example, when the thermistor is cool, its resistance is higher than that of the variable resistance, and the voltage across transformer primary 109 results in a grid voltage in the thyratron which is out of phase with that required to fire it. However, as the thermistor is heated in response to the surface temperature of the toast, its resistance becomes less than that of the variable resistor, resulting in a phase reversal in the voltage across transformer primary 109 and a consequent reversal of the grid potential on the thyratron, permitting it to fire. The use of variable resistor 108 permits manual variation of the balance point of the bridge and thus changes the temperature to which the thermistor must be heated in order to trigger the thyratron.

From the foregoing, the operation of this toaster becomes readily apparent. Its operation may be commenced by placing a slice of bread 14 in a toast-receiving slot with a slight downward force to close the carriage-operated switch and initate operation of motor 32. Alternately the manually operated switch may be depressed to commence toaster operation. The resulting downward movement of the toast carriage energizes the main toaster heating element to toast the slice of bread. As the surface temperature of the slice of bread increases, the resistance value of the thermistor decreases, resulting in a phase change in voltage on transformer primary 109. This continues until a predetermined temperature is reached, at which point the voltage across transformer secondary 110 is sufficiently high to cause control grid 112 to fire thyratron 113. Thereafter, power is supplied to heating element 105 surrounding bimetallic strip 102. The resulting heat responsive motion of the bimetallic strip separates contact 103 from contact 104 to terminate operation of motor 32. Carriage spring 30 then raises the toast carriage to its non-toasting position, exposing a portion of the completed toast above the toaster for ready removal.

It is to be understood, of course, that the gaseous discharge device, its grid resistors, the bimetallic strip, and its heating element, may be placed at any convenient point within the toaster enclosure. Furthermore, this control circuit is obviously but one of numerous circuits which may be employed for opening the contacts of a relay in response to the resistance change of the thermistor. Also, the power supplied from the thyratron when it is conducting may be employed to actuate other types of relays to terminate motor operation.

From the foregoing, it is seen that an improved automatic toaster control is provided for terminating a toasting cycle in response to the surface temperature of the toast itself. It may also be noted that by employing a thermistor, no moving contacts need to be present within the toasting compartment itself, hence eliminating faulty operation due to crumbs or other matter interfering with contact closure. By the use of a thermistor for the heat sensitive element, a control having a long life free from maintenance results, since no delicate contacts or other moving parts are necessary within the toasting chamber. Furthermore, this construction lends itself particularly well to a device for accurately measuring the temperature at the surface of the toast.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an automatic electric toaster, walls defining a toasting chamber, spaced toaster heater elements in the chamber, guide wires between the heater elements which define a toasting space to hold a bread slice for toasting, a toast rack in said toasting space, a temperature responsive device for terminating toaster operation in response to surface temperature of the toast comprising a non-metallic thermally sensitive resistor, a cup enclosing said resistor except for one exposed face thereof, means thermally and electrically insulating said resistor from said cup, a shoe attached to said cup for covering the exposed face of said resistor, said shoe being of relatively thin thermally conductive material, means mounting said cup within the toasting chamber with said shoe in proximity to said toasting space, an electric motor for moving said toast rack from non-toasting to toasting position, a control circuit for said motor, a thermal relay having contacts in said control circuit and a heating winding, and a temperature sensing circuit in which said thermally sensitive resistor and said heating winding are connected, change in current flow in said sensing circuit effecting operation of said thermal relay.

2. In an automatic electric toaster having a toast carriage mounted for reciprocating movement between non-toasting and toasting positions, resilient means biasing said carriage to its non-toasting position, an actuating circuit having electromagnetic means therein for driving to and retaining said carriage in toasting position, and a heating element energized upon movement of said carriage to toasting position, a timer for controlling the period of energization of said electromagnetic means, said timer comprising a non-metallic heat responsive resistance element mounted within the toaster for thermal engagement with a surface of a slice being toasted, a thermal relay having a heating winding and contacts, said contacts being in said actuating circuit, and a temperature sensing circuit including said relay heating winding and said heat responsive resistance element which in response to change in resistance of said resistance element effects operation of said relay.

3. In an automatic electric toaster having a toast carriage mounted for reciprocating movement between non-toasting and toasting positions, resilient means biasing said carriage to its non-toasting position, an actuating circuit including an electric torque motor for driving to and retaining said carriage in toasting position while remaining in an energized stalled position, and a heating element energized upon movement of said carriage to toasting position, means controlling the period during which said motor is energized, said means comprising a thermistor mounted adjacent the position occupied by a toast slice during toasting, a toast positioner operable upon movement of said carriage to its toasting position to force a surface of the toast slice into contact with said thermistor, a gaseous discharge device having a control grid in a circuit responsive to the resistance change of said thermistor, and a thermal relay comprising contacts in said actuating circuit and a heating winding in the plate circuit of said gaseous discharge device for terminating the toasting cycle when said tube is conducting in response to a predetermined temperature of said thermistor.

4. In an automatic electric toaster of a type having a toast carriage movable between toasting and non-toasting positions, resilient means biasing said carriage to its non-toasting position, a main toaster heating element energized upon movement of said carriage to its toasting position, and an actuating circuit including a torque motor for driving said carriage to toasting position against the action of said resilient means, said torque motor remaining in an energized stalled position for retaining said carriage in toasting position, control means for said torque motor, said control means comprising a carriage operated switch operable to closed position for commencing toaster operation upon a slight downward movement of said carriage, a thermistor positioned within the toaster and having a surface adapted to contact a surface of the toast, a toast positioner actuated by movement of said carriage to its toasting position to force a surface of the toast into thermal contact with said thermistor, thermal relay means comprising contacts in said actuating circuit and a heating winding, a temperature sensing circuit including said heating winding and said thermistor, said thermal relay being actuated in response to the resistance change of said thermistor to open said actuating circuit, and an adjustable resistance in said sensing circuit for manual control of the extent of toasting.

5. In an automatic electric toaster of the type having a toast carriage movable between a non-toasting and a toasting position between heating elements, a torque motor for driving said carriage to toasting position and retaining it in toasting position while remaining in an energized stalled condition, means biasing the carriage to non-toasting position and effective to move the carriage to non-toasting position when the torque motor is de-energized, and a control circuit for the motor, a toast cycle timing means comprising a non-metallic temperature sensitive resistor mounted in a position adjacent the slice position during toasting, means shielding said resistor from radiant heat, a thermally conducting plate carried by said resistor and adapted to contact a surface of the slice, a slice positioner pivotally carried by the carriage and movable from a normally non-engaging position to a position pressing the slice into contact with said plate, a stop in the path of travel of said positioner upon movement of the carriage to toasting position for pivoting said positioner to its slice pressing position, a temperature sensing circuit including said temperature sensing resistor, a normally closed thermal relay in said motor control circuit, an electric heater for actuating said relay to its open position in said temperature sensing circuit, said temperature sensitive resistor controlling current flow to said heater to terminate energization of said motor when said resistor reaches a predetermined high temperature.

JOHN H. PALMER.

REFERENCES CITED

The following references are of record in the file of this patent:

UNITED STATES PATENTS

| Number | Name | Date |
| --- | --- | --- |
| Re. 21,716 | Bacon | Feb. 18, 1941 |
| 2,042,595 | Graham | June 2, 1936 |
| 2,099,210 | Ireland | Nov. 16, 1937 |
| 2,149,965 | Ireland | Mar. 7, 1939 |
| 2,207,871 | Myers | July 16, 1940 |
| 2,266,301 | Biebel | Dec. 16, 1941 |
| 2,270,327 | Mills | Jan. 20, 1942 |
| 2,284,863 | Gulliksen | June 2, 1942 |
| 2,285,231 | Scharf | June 2, 1942 |
| 2,316,872 | Kernen | Apr. 20, 1943 |
| 2,349,614 | Denisoff | May 23, 1944 |
| 2,374,610 | MacLaren | Apr. 24, 1945 |
| 2,415,963 | Olving | Feb. 18, 1947 |
| 2,538,650 | Palmer | Jan. 16, 1951 |